United States Patent

[11] 3,563,582

| [72] | Inventors | Harold F. Shroyer<br>Barrington, Ill.;<br>Francis Jacob, New Castle, Pa. |
|---|---|---|
| [21] | Appl. No. | 750,177 |
| [22] | Filed | Aug. 5, 1968 |
| [45] | Patented | Feb. 16, 1971 |
| [73] | Assignee | said Jacob assignor to W. R. Grace & Co.,<br>Cambridge, Mass.<br>Continuation-in-part of application Ser. No.<br>550,024, May 13, 1966, now abandoned. |

[54] SPLINE JOINT
4 Claims, 5 Drawing Figs.

[52] U.S. Cl. ................................................. 287/20.92;
 52/585
[51] Int. Cl. .................................................. F16b 13/00
[50] Field of Search .................................. 52/396,
 586, 582, 496, 375, 585, 376, 364; 287/20.92
 (KEE), 189.36 (H), 189.36 (D), 20.92 (J), 20.92
 (W), 20.92 (C), 127; 24/87, 31.2, 123;
 94/(Inquired); 85/13, 14

[56] References Cited
UNITED STATES PATENTS

| 2,065,525 | 12/1936 | Hamilton | 85/14X |
| 2,844,848 | 7/1958 | Couse et al. | 52/586X |
| 3,172,237 | 3/1965 | Bradley | 52/396X |
| 3,310,917 | 3/1967 | Simon | 52/586X |
| 3,321,223 | 5/1967 | Snow et al. | 287/189.36H |

FOREIGN PATENTS

| 930,627 | 7/1963 | England | 52/396 |

*Primary Examiner*—David J. Williamowsky
*Assistant Examiner*—Wayne L. Shedd
*Attorneys*—C. E. Parker, Metro Kalimon and William Baker ABSTRACT: A spline joint for joining panels constructed of fragile resilient material such as expanded polystyrene, to form a rigid assembly. The panels have a seat comprising at least a portion running the length of each abutting end to be joined. The spline is a relatively hard strip having barbed end portions which are embedded in the walls of the seat. A central shoulder rests in the seat permitting the panels to be pushed together so that the spline itself is not seen in the assembly.

PATENTED FEB 16 1971

3,563,582

INVENTORS
HAROLD F. SHROYER
FRANCIS J. JACOB
BY
Metro Kalimon
Attorney

SPLINE JOINT

CROSS REFERENCE TO RELATED APPLICATIONS

This application is a continuation-in-part of application Ser. No. 550,024 filed on May 13, 1966, now abandoned.

BACKGROUND OF THE INVENTION

This invention relates to splines and joints. In one particular aspect, it relates to improvements in splines adapted for joining adjacent members through the insertion of portions of the splines into opposed seats formed in the members.

Recent innovations in the building trade have resulted in the development of new materials for use as decorative or insulating paneling in homes, offices and storage areas. Of particular importance is the ever-increasing use of plastics, such as foamed polystyrene. This material is particularly useful where an appreciable temperature gradient must be maintained as in freezers, coolers, meat storage enclosures and the like. Conventional means of joining polystyrene panels, such as tongue and groove joints, have been ineffectual, because such joints can fracture easily, or become distorted and hard to fit on the job site. Poor fitting creates areas of vapor transmission and heat loss.

Prior art devices of this type are adapted to join panels constructed of relatively hard and rigid materials. In such cases, the joining member may be fixed to the panels by nails or other fasteners which are not suitable for use with expanded polystyrene. Alternatively, the splines may be constructed of a resilient material which, when inserted into a slot in the rigid panel, grips the panel by friction.

SUMMARY OF THE INVENTION

In the present invention, soft resilient panels of foamed plastic such as polystyrene are installed in end-abutting relationship. The abutting ends have aligned in them seats comprising a groove and a narrow slot both running longitudinally along at least a portion of the end, the slot extending inwardly from about the midpoint of the groove. Inserted into the seat is a relatively hard spline strip terminating in barbed edges. The barb, being larger than the slot pushes a portion of the panel material aside as it enters but remains embedded against retraction in the slot wall.

The spline instead of comprising a strip, may have a finite length dimension such that its length and thickness are generally equal. In such case the seats may be apertures placed at selected intervals along the end of the panel to receive the spline.

DESCRIPTION OF THE PREFERRED EMBODIMENTS

Figure 1:
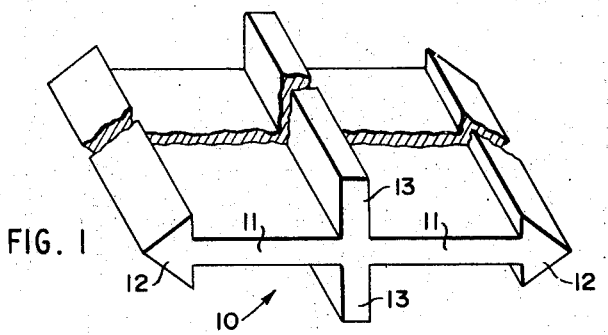
FIG. 1 is a perspective view of a portion of one embodiment of the spline.

FIG. 1 illustrates the spline generally indicated by the reference numeral 10. The spline 10 is a strip composed essentially of a hard rigid body 11 having opposed barbed end portions 12 and an intermediate shoulder 13 extending generally perpendicularly from the midsection of the body 11.

Figure 2:
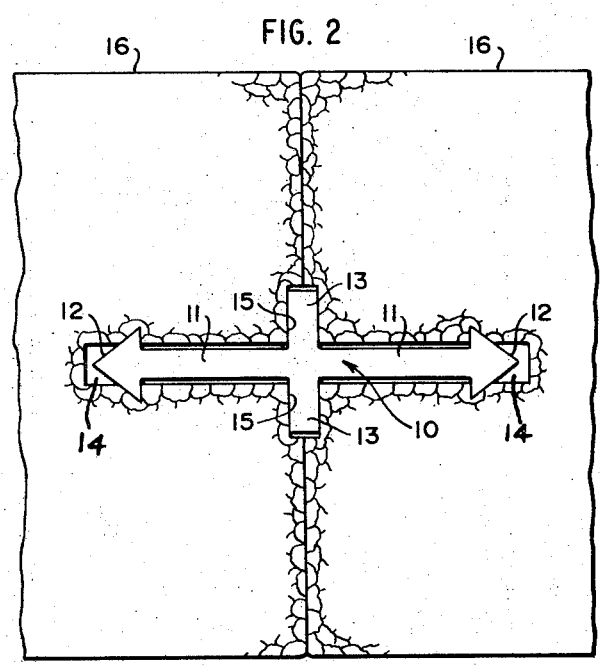
FIG. 2 is a plan view of the completed spline joint.

Referring to FIG. 2, the spline 10 is inserted into a slot 14 within a polystyrene panel 16 until the shoulder 13 engages the groove 15. The tips on the barb 12 are wider than slot 14. As the spline 10 is inserted, the polystyrene foam compresses to allow it to pass, expanding however, behind the barb preventing removal of the spline 10. The spline 10 is pushed in until the shoulder 13 rests in the groove 15. The slot 14 and the groove 15 are referred to herein as the seat.

The second panel 16 is mated to the first by aligning the barb 12 with the slot 14 and the panel is pushed until it abuts the first panel 16.

The pressure of the panels 16 on the barbs 12 locks the panels 16 together creating a vapor-tight seal.

Figure 3:
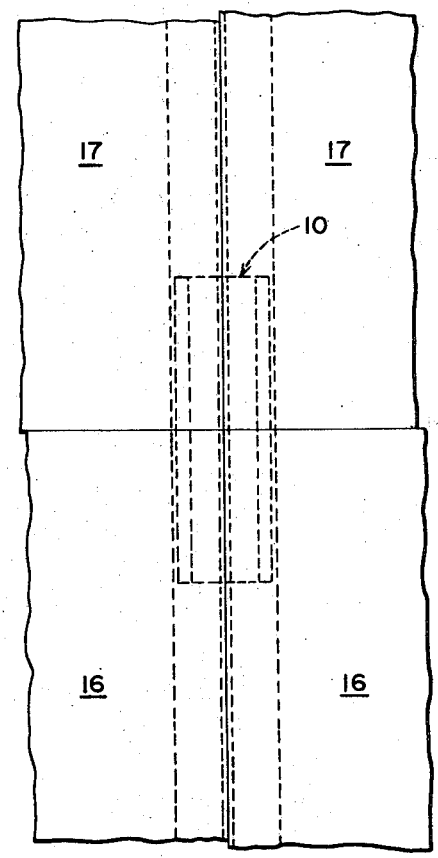
FIG. 3 is an elevational view showing the spline joint applied across two rows of panels.

FIG. 3 illustrates the spline 10 extended beyond the end of a panel pair 16—16 into the adjacent panel pair 17—17. This will give a tie between ends of the panels permitting extended rows of panels to be rigidly constructed. It will also eliminate sagging when the panels are applied as a ceiling or roof underlayment.

As can be seen from FIGS. 1, 2, 3 and 5, the spline is an elongated member whose body 11 is substantially flat and fits easily in the slots 14 while the barb shaped ribs 12 remain seated in the soft resilient panel material.

Figure 4:
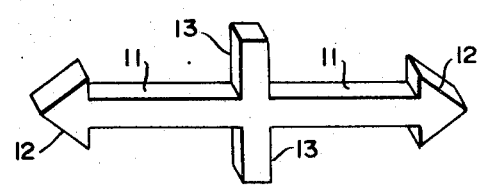
FIG. 4 is an alternate embodiment of the spline.

FIG. 4 shows an alternate embodiment of the spline having a finite length so that the body 11 is generally square in cross section instead of a strip as illustrated in the embodiment of FIG. 1.

In this form the spline would be installed at selected points along the abutting surfaces. It may be installed in a seat and slot arrangement as illustrated in FIG. 2 or may fit in apertures of similar conforming shape. It may also be installed so that the shoulder 13 extends along the ends of the panels rather than at right angles as is the case with the strip spline.

Figure 5:
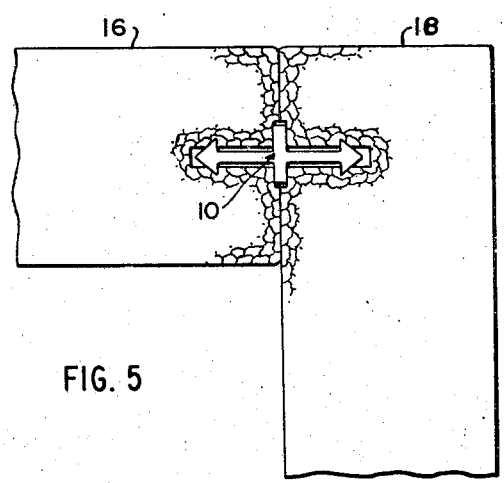
FIG. 5 is a plan view which illustrates a corner joint.

FIG. 5 shows an embodiment of the invention configured for a corner joint. In this case the slot and seat are placed in the butt-mated face of one panel 16 and in the end of the other panel 18.

In all embodiments, the spline is hidden and the panels are in abutting contact giving a tight joint and a uniform appearance. The joint formed is leakproof and moistureproof and preserves the insulating characteristics of the panel.

Splines in accordance with this invention can be fabricated from a wide variety of materials such as plastic, wood or metal. Polyethylene, polyurethane, epoxy resins, phenol formaldehyde resins, polystyrene, aluminum and steel are the preferred materials. The choice of materials will depend primarily upon the application and type of service required from the structure in which they are employed.

The structures joined by the spline of this invention are not restricted to any particular shape and may be in the form of panels, boards, planks, and the like. These structures can be fabricated from a wide variety of thermoplastic materials with expanded polystyrene being preferred.

The spline and structures can be assembled readily by hand in the field at the time of erection. This eliminates the need for male-female relationship of structures designed with tongue-and-groove.

It is apparent from the foregoing specification, that the present invention is susceptible to various alternations and modifications and for this reason the specification is intended to be merely illustrative and is not to be construed as limiting the invention.

We claim:

1. The combination of adjoining sections of a soft resilient foam plastic material having aligned seats formed therein the seats including aligned shoulder receiving grooves; and an elongated spline of a material which is rigid relative to the material of the adjoining sections having a flat body portion fitting within said seats, and having elongated ribs in the form of oppositely engaging barb shaped end portions at the ends of said spline the barbs projecting beyond the seats into the adjoining sections and including an elongated intermediate shoulder portion extending perpendicularly and received in part in each of the aligned shoulder receiving grooves, whereby the depth of entry of the elongated ribs is controlled while permitting close adjoinment of the respective sections so that the spline is hidden.

2. The combination according to claim 1 wherein the adjoining sections consist of a material selected from the group consisting of expanded polyethylene, expanded polypropylene, expanded polystyrene and expanded polyurethane.

3. The combination according to claim 1 wherein the spline consists of a material selected from the group consisting of polyethylene and polystyrene.

4. A spline joint comprising in combination; adjoining soft resilient panel sections having aligned in the abutting end portions thereof seats comprising a groove extending longitudinally of said ends, a slot of lesser width than, and extending from about the midpoint of the groove inward into said panel; a spline comprising a strip of hard material relative to said panel having a barb shaped elongated rib at the ends of the strip for embedding in the walls of said slot against extraction therefrom and including a central intermediate shoulder portion perpendicular to said strip substantially coextensive with said adjoining grooves for controlling the depth of entry of said ribs while permitting close adjoinment of said panels so that said spline is hidden.